(12) United States Patent
Palle Venkata et al.

(10) Patent No.: US 12,445,981 B2
(45) Date of Patent: *Oct. 14, 2025

(54) UPLINK TIMING SYNCHRONIZATION MAINTENANCE IN SECONDARY CELL GROUP

(71) Applicant: Apple Inc., Cupertino, CA (US)

(72) Inventors: Naveen Kumar R. Palle Venkata, San Diego, CA (US); Fangli Xu, Beijing (CN); Dawei Zhang, Saratoga, CA (US); Haijing Hu, Beijing (CN); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,665

(22) Filed: Feb. 7, 2024

(65) Prior Publication Data

US 2024/0224201 A1 Jul. 4, 2024

Related U.S. Application Data

(63) Continuation of application No. 17/439,451, filed as application No. PCT/CN2021/084431 on Mar. 31, 2021, now Pat. No. 11,943,722.

(51) Int. Cl.
*H04W 56/00* (2009.01)
*H04W 24/08* (2009.01)
(Continued)

(52) U.S. Cl.
CPC ....... *H04W 56/0005* (2013.01); *H04W 24/08* (2013.01); *H04W 74/0833* (2013.01); *H04W 76/15* (2018.02)

(58) Field of Classification Search
CPC ............. H04W 56/0005; H04W 24/08; H04W 74/0833; H04W 76/15; H04W 56/0045;
(Continued)

(56) References Cited

U.S. PATENT DOCUMENTS 9,210,673 B2 12/2015 Li
10,499,300 B2 12/2019 Dinan
(Continued)

FOREIGN PATENT DOCUMENTS

WO 2014127506 8/2014
WO 2018063068 4/2018
(Continued)

OTHER PUBLICATIONS

Ericsson, Mobility and RRM for deactivated SCG, 3GPP TSG-RAN WG2 #113e, Electronic meeting, Jan. 25-Feb. 5, 2021, R2-2101094 (Year: 2021).*
(Continued)

*Primary Examiner* — Michael Thier
(74) *Attorney, Agent, or Firm* — Kowert, Hood, Munyon, Rankin & Goetzel, P.C.

(57) ABSTRACT

Aspects are presented herein of apparatuses, systems, and methods for secondary cell group (SCG) addition. A wireless device may establish communication with a first base station that is comprised in a master cell group (MCG) and a second base station that is comprised in the SCG. The wireless device may maintain timing advance (TA) parameters for performing uplink communication with the second base station. The wireless device may perform a plurality of signal quality measurements after receiving an indication to deactivate the SCG. The wireless device may determine whether to reuse the TA parameters for communicating with the second base station after receiving an indication. The determination may be based on comparing one or more signal quality measurements of the second base station to one or more signal quality thresholds.

20 Claims, 12 Drawing Sheets

(51) Int. Cl.
*H04W 74/0833* (2024.01)
*H04W 76/15* (2018.01)

(58) Field of Classification Search
CPC ...... H04W 76/19; H04L 5/001; H04L 5/0094; H04L 5/0098
See application file for complete search history.

(56) References Cited

U.S. PATENT DOCUMENTS

| | | | |
|---|---|---|---|
| 11,395,299 B2 * | 7/2022 | Babaei | H04W 24/08 |
| 2013/0258958 A1 | 10/2013 | Dinan | |
| 2014/0112308 A1 | 4/2014 | Kwon | |
| 2014/0192798 A1 | 7/2014 | Yang | |
| 2018/0279334 A1 | 9/2018 | Lim | |
| 2019/0191449 A1 | 6/2019 | Yang | |
| 2019/0357092 A1 | 11/2019 | Jung | |
| 2020/0029326 A1 | 1/2020 | Wang | |
| 2020/0221309 A1 | 7/2020 | Ozturk | |
| 2020/0260397 A1 | 8/2020 | Vos | |
| 2020/0389826 A1 | 12/2020 | Park | |
| 2020/0396656 A1 | 12/2020 | Yang | |
| 2023/0030443 A1 * | 2/2023 | Chen | H04W 56/0045 |

FOREIGN PATENT DOCUMENTS

| | | |
|---|---|---|
| WO | 2020026154 | 2/2020 |
| WO | 2020031043 | 2/2020 |
| WO | 2020113442 | 6/2020 |
| WO | 2020114372 | 6/2020 |
| WO | 2020165865 | 8/2020 |
| WO | 2020190188 | 9/2020 |
| WO | 2020263051 | 12/2020 |
| WO | 2021038472 | 3/2021 |

OTHER PUBLICATIONS

Ericsson "On the need for random access during SCG activation"; 3GPP TSG-RAN WG2 #113e R2-2101095; Feb. 5, 2021.
CATT "Further Considerations on Efficient SCG Activation/Deactivation"; 3GPP TSG-RAN WG2 Meeting #113 electronic R2-2101235; Feb. 5, 2021.
LG Electronics Inc. "Efficient SCG Activation mechanism"; 3GPP TSG-RAN WG2 Meeting #112-e R2-2010283; Nov. 13, 2020.
OPPO "Open issues for activation of deactivated SCG"; 3GPP TSG-RAN WG2 Meeting #113 bis electronic R2-2102899; Apr. 20, 2021.
LG Electronics Inc. "Actvation and Deactivation on SCG"; 3GPP TSG-RAN WG2 Meeting #113Bis-e R2-2103570; Apr. 20, 2021.
Intel Corporation "Considerations on reactivating SCG"; 3GPP TSG-RAN WG2 Meeting #113bis-e R2-2104231; Apr. 20, 2021.
International Search Report and Written Opinion for PCT/CN2021/084431; Dec. 30, 2021.
Ericsson "Mobility and RRM for deactivated SCG"; 3GPP TSG-RAN WG2 Electronic Meeting #113e R2-2101094; Feb. 5, 2021.
Vivo "Activation and deactivation mechanism for SCG and SCells"; 3GPP TSG-RAN WG2 Electronic Meeting R2-2010290; Nov. 13, 2020.

* cited by examiner

UPLINK TIMING SYNCHRONIZATION MAINTENANCE IN SECONDARY CELL GROUP

PRIORITY INFORMATION

This application is a continuation of U.S. patent application Ser. No. 17/439,451, titled "Uplink Timing Synchronization Maintenance in Secondary Cell Group," filed Sep. 15, 2021, which is a national phase entry of PCT/CN2021/084431, filed on Mar. 31, 2021, titled "Uplink Timing Synchronization Maintenance in Secondary Cell Group", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, including apparatuses, systems, and methods for secondary cell activation and change procedures.

BACKGROUND

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services. Increased reliability in these communication systems are desirable.

SUMMARY

Aspects are presented herein of apparatuses, systems, and methods for secondary cell group (SCG) re-activation.

A wireless device may establish communication with a first base station that is comprised in a master cell group (MCG) and a second base station that is comprised in the SCG. The wireless device may maintain timing advance (TA) parameters for performing uplink communication with the second base station. The wireless device may perform a plurality of signal quality measurements after receiving an indication to deactivate the SCG. The wireless device may determine whether to reuse the TA parameters for communicating with the second base station after receiving an indication. The determination may be based on comparing one or more signal quality measurements of the second base station to one or more signal quality thresholds.

A cellular network may establish communication with a wireless device using a first base station. The first base station may be included in a master cell group (MCG) of the wireless device. The cellular network may establish communication with the wireless device using a second base station. The second base station may be included in a secondary cell group (SCG) of the wireless device. The cellular network may maintain one or more timing advance (TA) parameters for receiving uplink communication from the wireless device using the second base station. The cellular network may provide a configuration to the wireless device for determining whether to reuse the one or more TA parameters after SCG activation. At a first time, the cellular network may provide an indication to deactivate the SCG to the wireless device. At a second time, the cellular network may provide an indication to activate the SCG to the wireless device, wherein the wireless device is configured to determine whether to reuse the one or more TA parameters based on the configuration. The cellular network may communicate with the wireless device using the second base station.

In some aspects, a non-transitory memory medium may include program instructions executable by a UE that, when executed, cause the UE to perform at least a portion or all of the above operations. In some aspects, a method performed by the UE may include the UE performing the above operations. In some aspects, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed aspects can be obtained when the following detailed description is considered in conjunction with the following drawings, in which.

Figure 1:
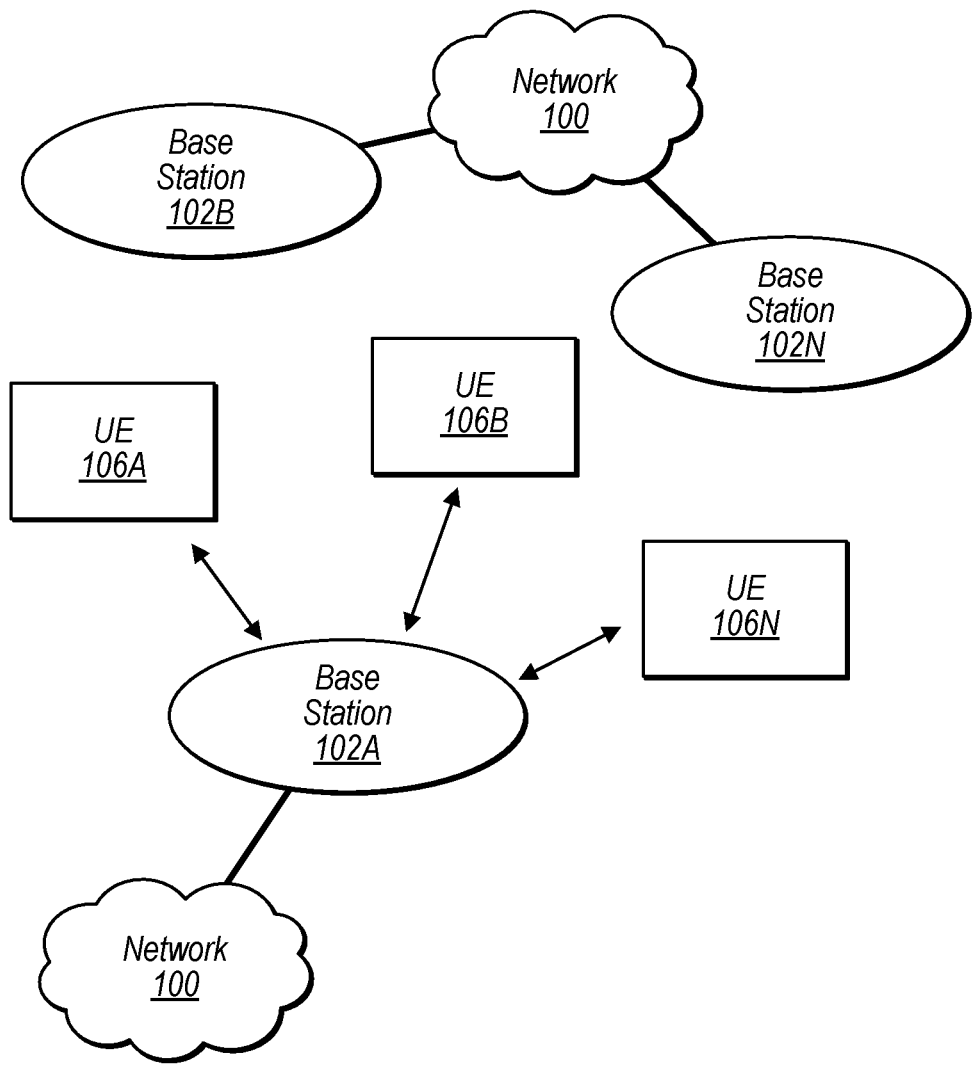
FIG. 1 illustrates an example wireless communication system, according to some aspects.

While the invention is susceptible to various modifications and alternative forms, specific aspects thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE ASPECTS

Acronyms

The following acronyms are used in the present Patent Application:
UE: User Equipment
BS: Base Station
ENB: eNodeB (Base Station)
GNB: gNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device: a computer system memory or random access memory such as DRAM. DDR RAM. SRAM. EDO RAM. Rambus RAM, etc.: a non-volatile memory such as a Flash, magnetic media, e.g., a hard drive, or optical storage: registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance. Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones, tablet computers, portable gaming devices, wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
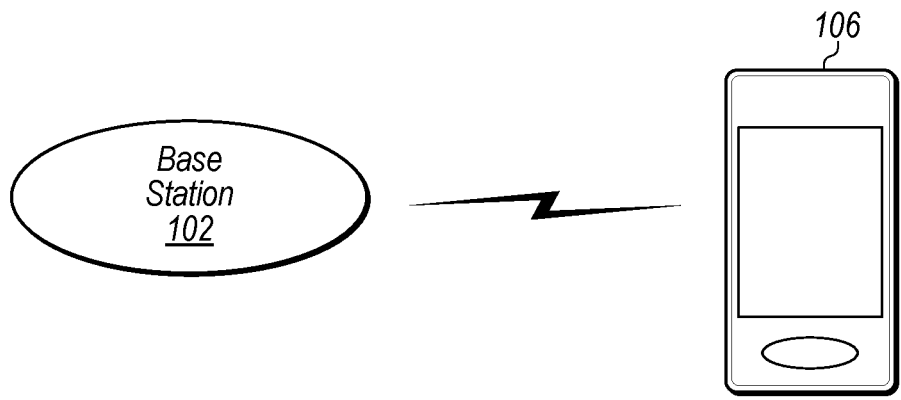
FIG. 2 illustrates a base station (BS) in communication with a user equipment (UE) device, according to some aspects.

FIGS. 1 and 2—Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some aspects, base station 102 may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method aspects described herein by executing such stored instructions. Alternatively, or in addition, the UE 106 may include a programmable hardware element such as an FPGA (field-programmable gate array) that is configured to perform any of the method aspects described herein, or any portion of any of the method aspects described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
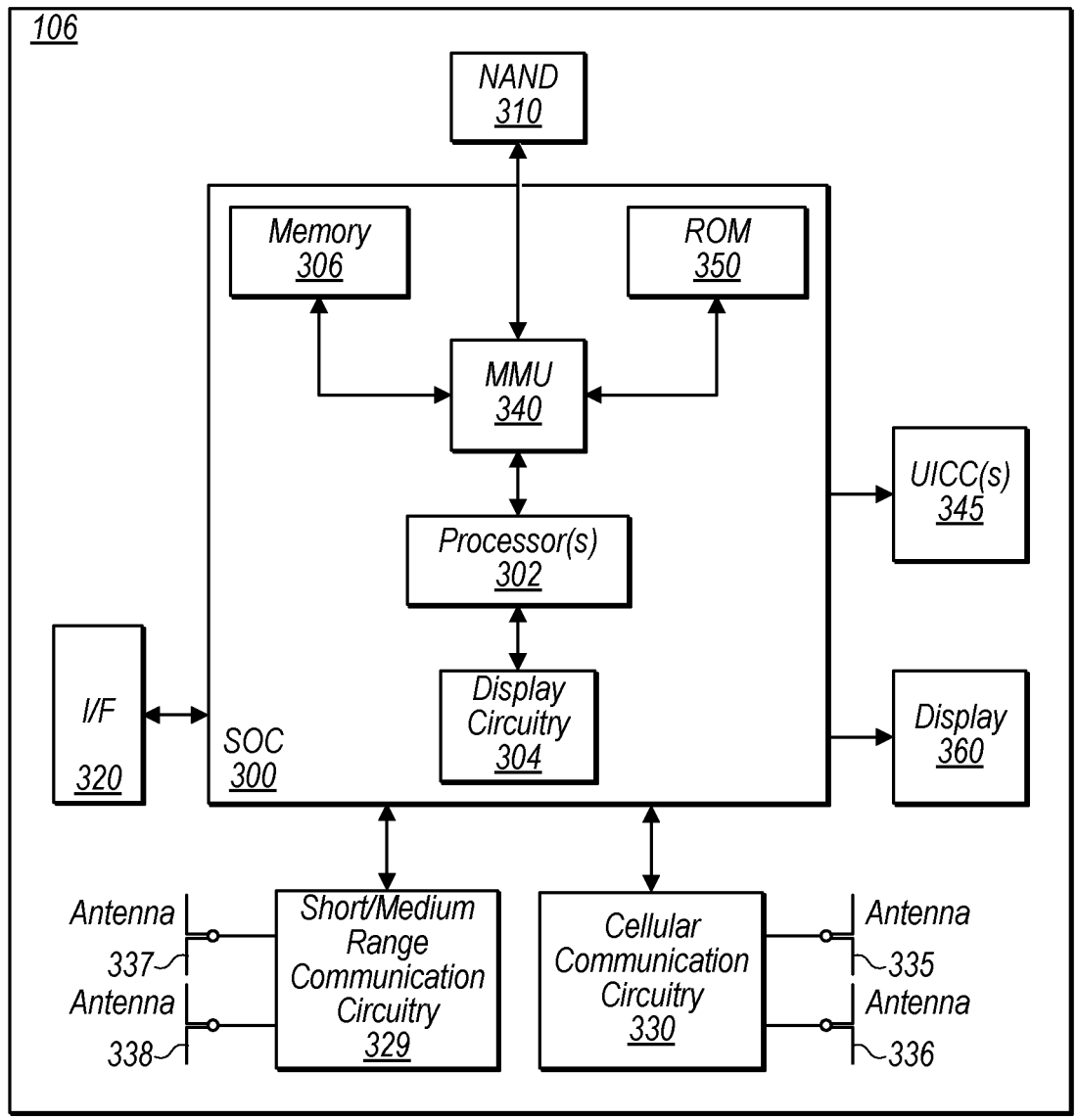
FIG. 3 illustrates an example block diagram of a UE, according to some aspects.

FIG. 3—Block Diagram of a UE

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively: directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively: directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively: directly or indirectly) to the antennas 335 and 336 in addition to, or instead of, coupling (e.g., communicatively: directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below; cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
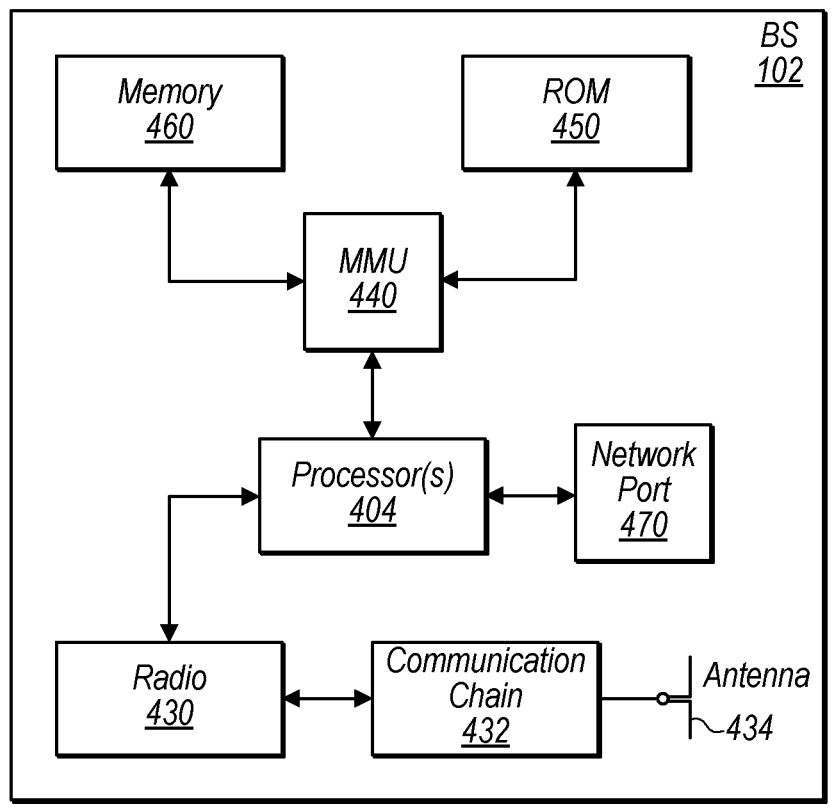
FIG. 4 illustrates an example block diagram of a BS, according to some aspects.

FIG. 4—Block Diagram of a Base Station

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430) and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
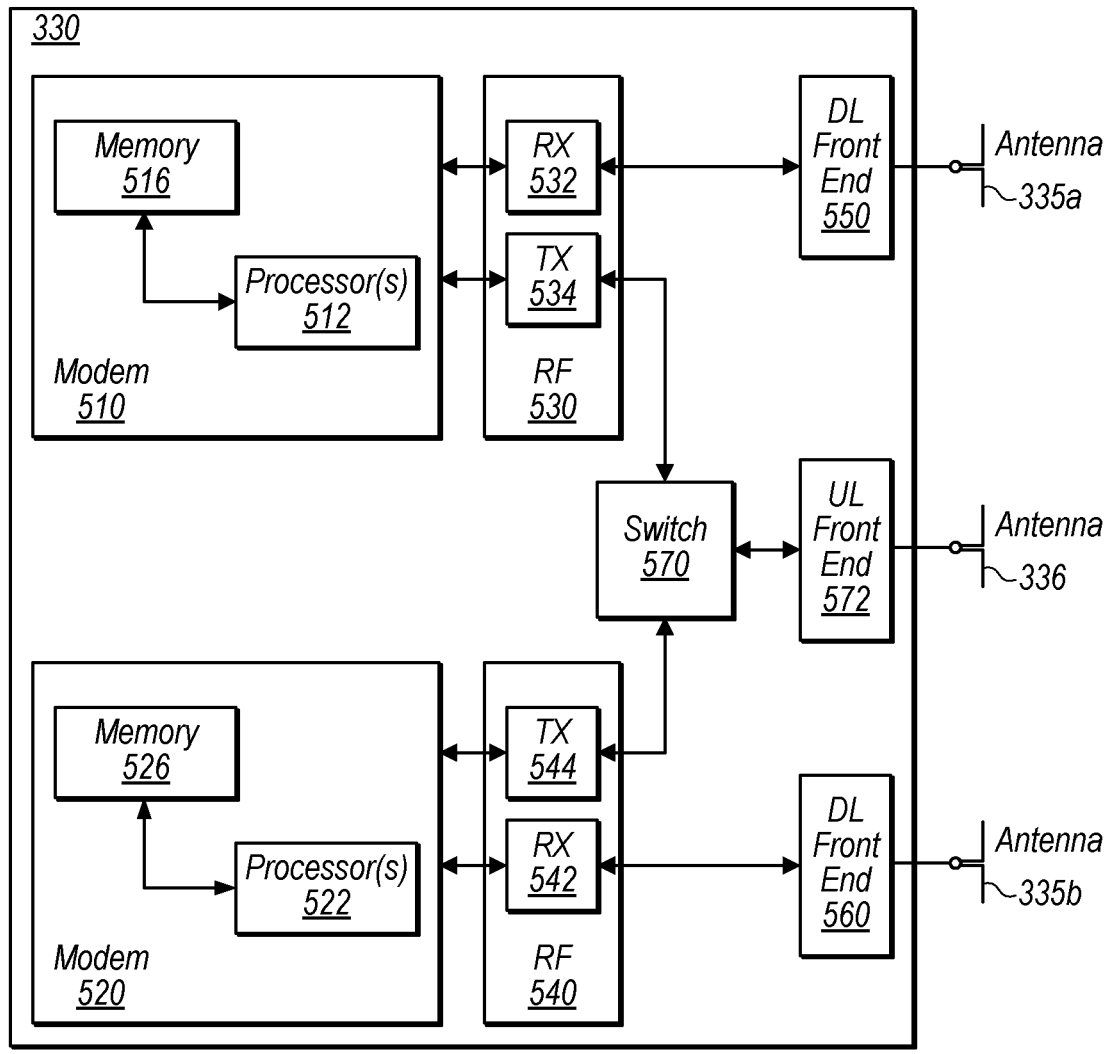
FIG. 5 illustrates an example block diagram of cellular communication circuitry, according to some aspects.

FIG. 5—Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit: other circuits, such as circuits including or coupled to sufficient antennas for different RATs to perform uplink activities using separate antennas, are also possible. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively: directly or indirectly) to one or more antennas, such as antennas 335a-b and 336 as shown (in FIG. 3). In some aspects, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540). RF front end 540) may include circuitry for transmitting and receiving radio signals. For example, RF front end 540) may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570) may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some aspects, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some aspects, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
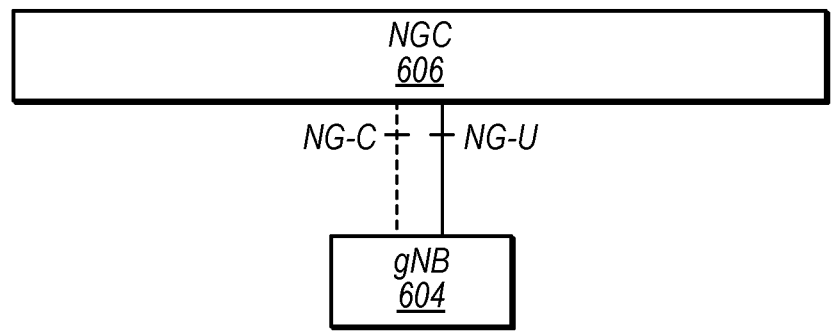
FIGS. 6 and 7 illustrate examples of a 5G NR base station (gNB), according to some aspects.
Figure 7:
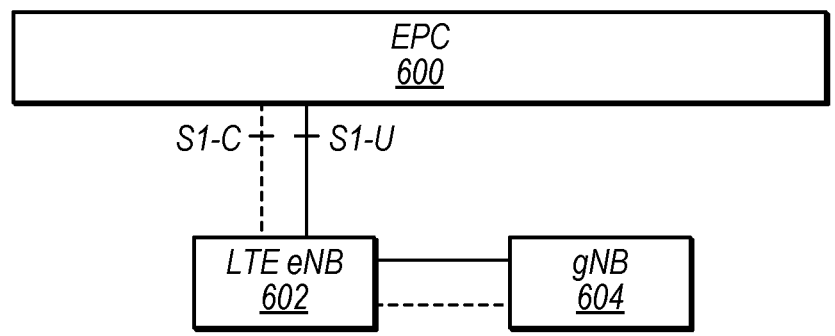

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
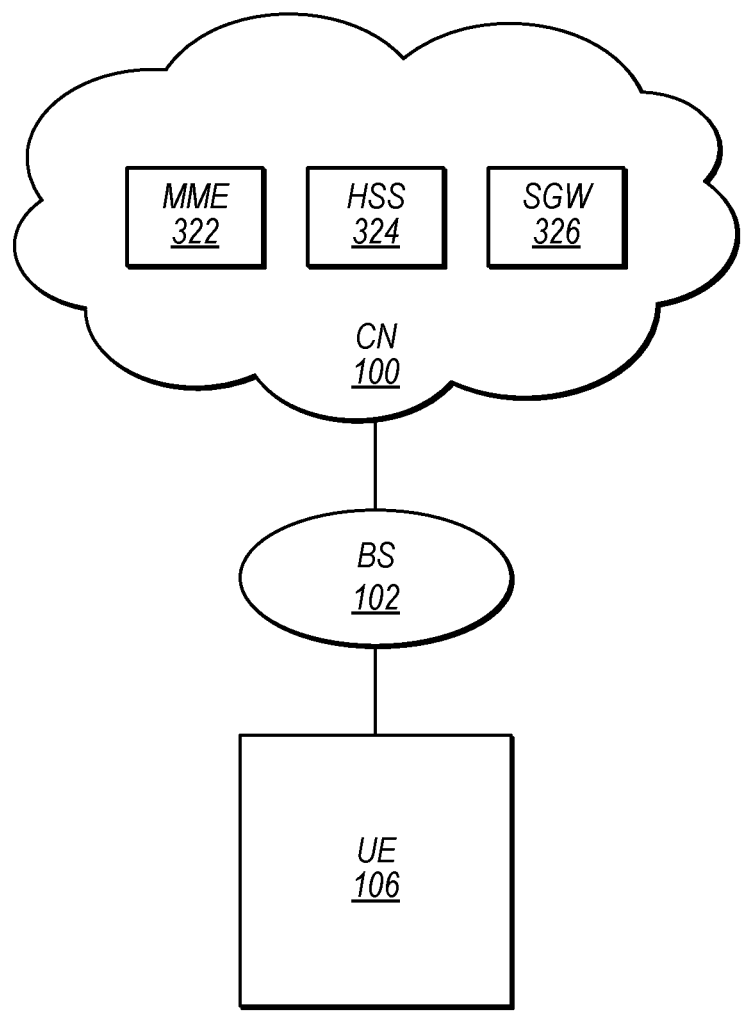
FIG. 8 illustrates an exemplary wireless network in communication with a UE, according to some aspects.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
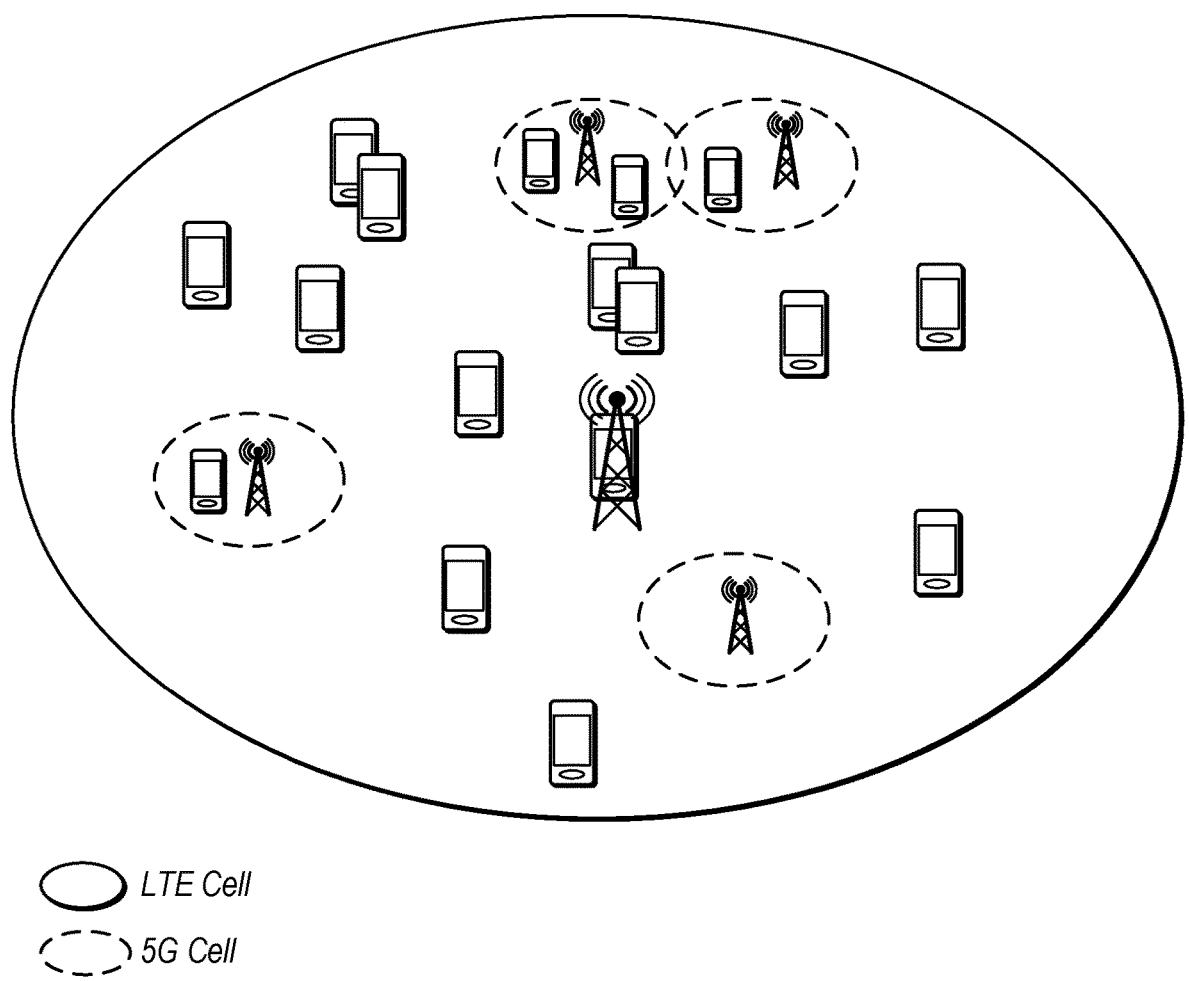
FIG. 9 is a diagram illustrating an example cell coverage scenario for macro and small cells, according to some aspects.

FIG. 9—Example Cellular Environment

FIG. 9 illustrates an example cellular environment where multiple UEs are within the range of a macro cell or an LTE cell (e.g., which may be part of a master cell group (MCG) of one or more UEs). Within the macro cell, multiple smaller cells (e.g., 5G or NR cells) may be available for providing connectivity to UE(s). The smaller cells may be secondary cells or part of a secondary cell group (SCG) of one or more UEs.

When a UE is configured with a SCG, the UE may maintain connectivity to both the MCG and the SCG. For example, for the MCG, the primary cell (PCell) may always be activated. In the SCG, the primary secondary cell (PS-Cell) may be activated or deactivated. In some aspects, the PSCell may be in an activated state or a deactivated state, e.g., based on signaling between the network and the UE.

Figure 10:
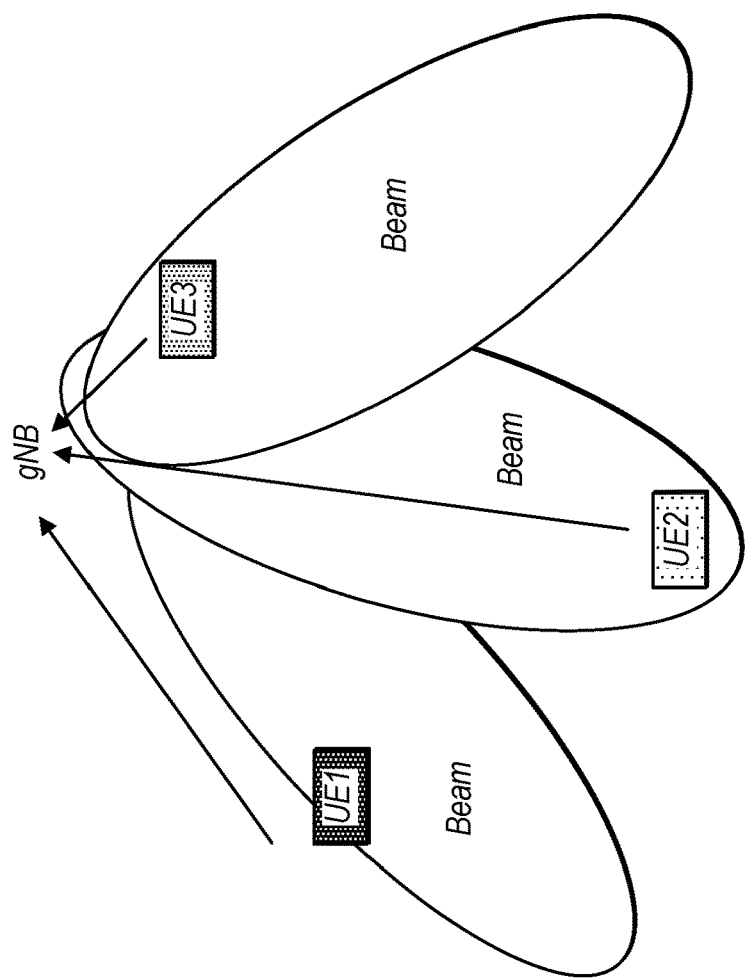
FIG. 10 is a diagram illustrating timing advance, according to some aspects.
Figure 10:
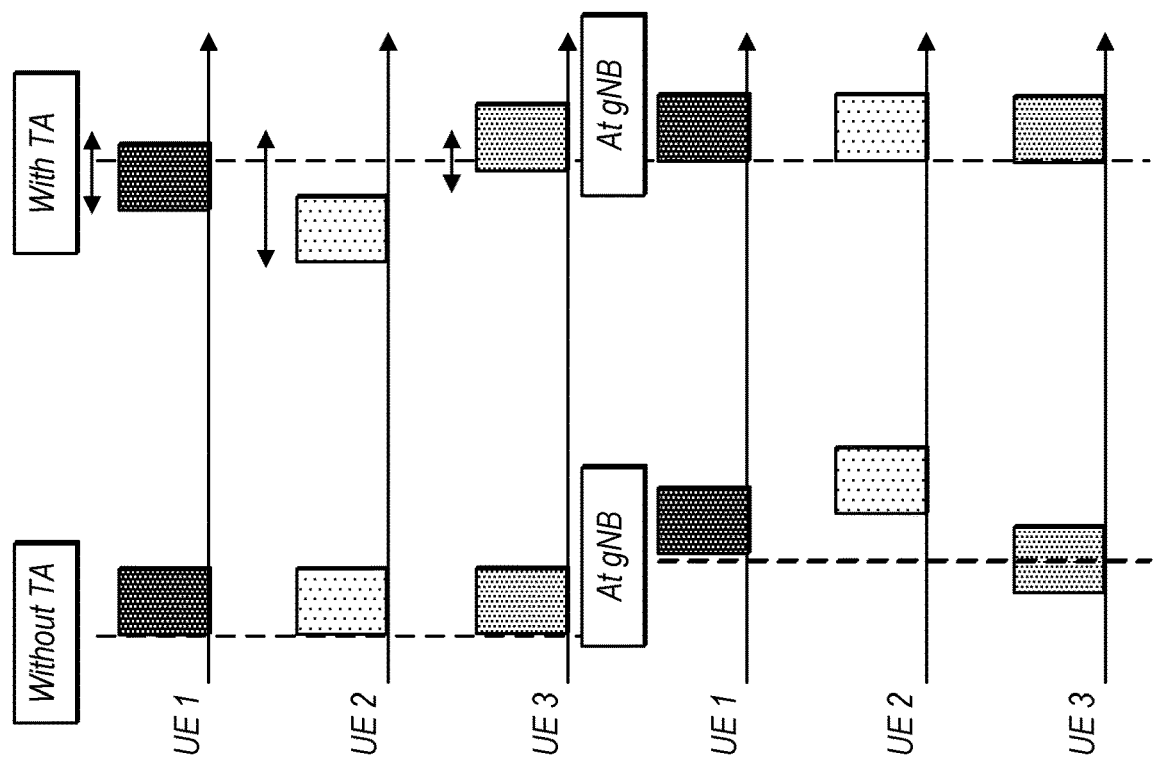

FIG. 10—Timing Advance

FIG. 10 is a diagram illustrating the effects of timing advance. As shown in the Figure, UEs 1, 2, and 3 are located at different distances from the gNB and may have different pathlosses, environments, etc. when communicating with the gNB. If these UEs transmitted without any timing advance adjustments, they arrive at the gNB at different times, as shown on the left side "Without TA". Accordingly, by providing timing advance information (e.g., parameters, indications, values, etc.) to these UEs, each UE can transmit at different times, allowing the gNB to receive the transmissions at approximately the same time. By aligning the reception of the UE uplink transmissions, the gNB is able to successfully decode the transmitted data from all three UEs. In this example, UE2 transmits sooner than UE1, which transmits sooner than UE3 due to UE2 being further away from the gNB than UE1, which is in turn further away than UE3.

Figure 11:
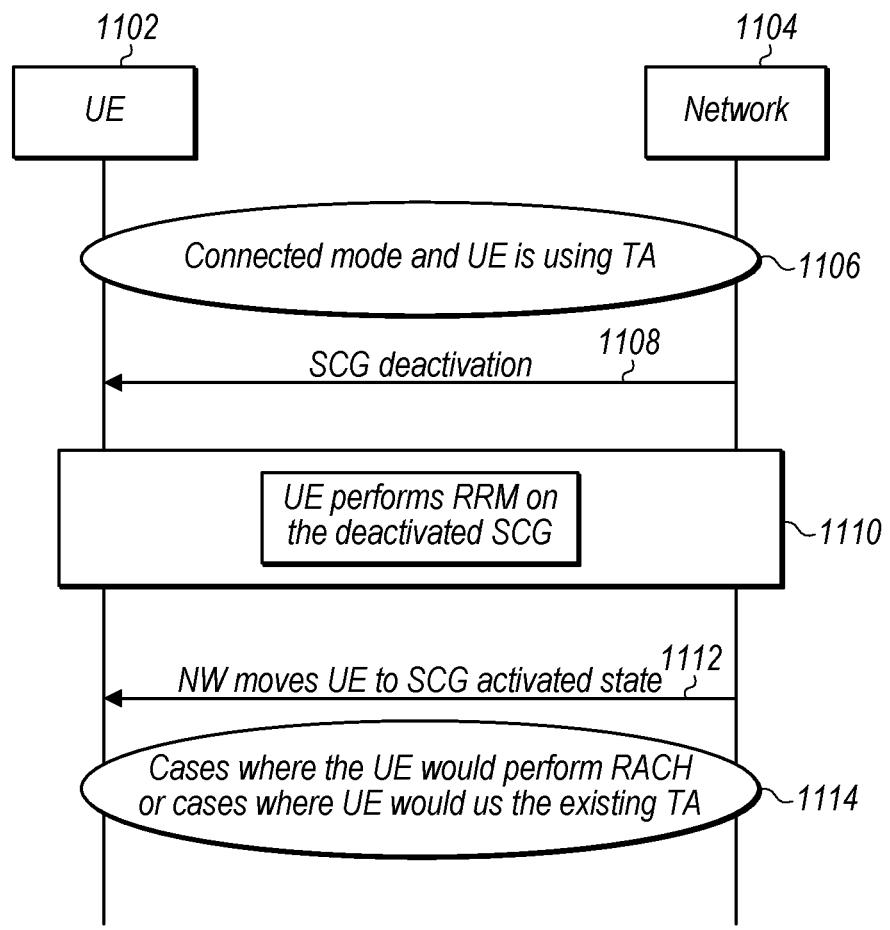
FIG. 11 is a flow chart diagram illustrating an example method for secondary cell group deactivation and activation, according to some aspects.

Usually, during random access channel (RACH) attachment, the network (e.g., the gNB) may estimate the timing advance a UE needs to make, so that "all" the receptions from different UEs arrive at the same time at the gNB (as shown in FIG. 11). The gNB may then provide the respective timing advance (TA) feedback based on respective uplink transmissions received from each UE. The gNB may also provide periodic TA adjustments based on uplink transmissions, e.g., while each UE is in connected mode and performing (e.g., continuous) respective uplink transmissions.

FIG. 11—SCG Reactivation

FIG. 11 illustrates an example flow chart for SCG reactivation. Aspects of the method of FIG. 11 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various aspects, some of the elements of the methods shown may be performed concurrently, in a different order than shown, may be substituted for by other method elements, or may be omitted. Additional method elements may also be performed as desired. As shown, the method may operate as follows.

In 1106, the UE 1102 may be connected to cellular network 1104. The UE may be in communication with the network in various different ways and may have established communication according to various techniques, e.g., according to 3GPP standards. In some aspects, the UE may establish communication with one or more cells of an MCG. The UE (e.g., at the direction of the MCG) may also establish communication with one or more cells of an SCG. A primary cell (PCell) of the MCG may be a macro cell (e.g., as show in FIG. 9). A primary cell of the SCG (PSCell) may be a small cell and/or a gNB. However, other connections are also envisioned, e.g., where one or more cells of the MCG is a small cell and/or one or more cells of the SCG is a macro cell, as desired.

In some aspects, the UE may be communicating with the network while in connected mode. The network may provide TA parameters and/or adjustments to the UE, e.g., based on uplink communication from the UE to the network. Note that there may be different TA parameters used for different cells, e.g., the PCell may indicate one set of TA parameters for communication while the PSCell may indicate a different set of TA parameters for communication. In general, the TA parameters discussed herein may primarily apply to cell(s) of the SCG, although these aspects may also be applied to cell(s) of the MCG, as appropriate.

In 1108, a secondary cell (e.g., in an SCG) and/or the SCG may be deactivated for a UE. For example, the UE may be connected to a primary cell (e.g., and potentially other cells) in the MCG as well as a primary cell (e.g., and potentially other cells) in the SCG. One or more cells (or all of the cells) of the SCG may be put in a deactivated state, e.g., based on message(s) received from the network (e.g., from the MCG, the SCG, and/or another node of the network). Thus, one or more SCG deactivation messages may be received from cell(s) in the MCG and/or cell(s) in the SCG. For example, the PSCell may provide an SCG deactivation indication (e.g., via one or more messages) to the UE, e.g., via one or more control channels. Alternatively, the PCell may provide an SCG deactivation indication (e.g., via one or more messages) to the UE, e.g., via one or more control channels.

In the control plane, for the deactivated state of SCG, uplink communication with the PSCell may not be permitted. In some aspects, all of the SCells in the SCG (or the SCG itself) may be deactivated. In some aspects, there may not be any radio resource control (RRC) signaling to the UE on the SCG. However, the UE may still be expected to perform radio resource management (RRM), e.g., including signal quality measurements of cell(s) in the SCG. Additionally, the UE may still remain in the RRC connected state (e.g., when communicating with cell(s) in the MCG). Thus, the UE may be configured to continue to perform communication with the MCG while the SCG is in the deactivated state, as desired.

In the user plane, according to some aspects, the UE may not monitor PDCCH on the PSCell, which results in no uplink allocations or uplink grants. Thus, in some aspects, in the SCG deactivated state, the UE may not be required to transmit PUSCH and PUCCH in the uplink for as long as the UE is in SCG deactivated state.

As noted above, TA parameters may be established and/or adjusted based on uplink communications. Accordingly, because the UE may not perform uplink communication with cell(s) of the SCG while in the SCG deactivated state, the TA parameters may not be updated or adjusted during the period of deactivation. Accordingly, the UE may not know if the previous TA values or parameters are still valid during the deactivated state. Upon reactivation, the UE may determine whether to use the previous TA parameters (e.g., stored prior to deactivation and/or at the time of deactivation) or to initiate a RACH or other process in order to obtain new TA parameters.

Thus, in 1112 and 1114, at the transition to the SCG activated state (e.g., from the SCG deactivated state), the UE may determine to whether to use stored TA parameters or to perform a different process, such as RACH, to reestablish synchronization in communicating with cell(s) in the SCG. In some aspects, the UE may attempt to reuse the stored TA parameters and/or avoid RACH process whenever possible. When the UE is able to use the stored TA parameters, the UE may be able to begin communicating much faster than would otherwise be possible using another process, such as RACH. Said another way, the RACH process may take time to reestablish communication (e.g., including TA parameters), which may provide a worse user experience (e.g., a delay in communication) than if the stored TA parameters could be used. Thus, aspects described herein may allow the UE to be able to perform uplink transmission quickly, e.g., without network involvement, for faster SCG activation.

As described regarding FIG. 9), usually (but not always), the MCG is provided by a macro cell and the SCG is via a small cell (e.g., using greater than 6 GHz spectrum). In some aspects, the UEs TA parameters may not need to be adjusted in small cells, e.g., because the signal propagation delay is not significant between cell edge and center of the cell for small cells. However, due to higher frequencies and/or the higher sub-carrier spacing (SCS), there can be some TA adjustment needed even in small cells, e.g., when using higher SCS such as 60 or 120 KHz SCS, among other possibilities. Additionally, or alternatively, beam switching may also result in an adjustment of TA.

In some aspects, the UE may be able to use information from UE activities during SCG deactivation to determine whether to reuse previous TA values. For example, the UE may perform signal quality measurements for the PSCell during the SCG deactivated state, e.g., as part of RRM (e.g., in 1110). For example, these signal quality measurements may include measuring reference signals and associated beams to derive the cell quality and/or beam quality. These measurements may be used by the UE to make a decision on whether to reuse previous TA parameters for uplink communication. For example, while the signal strength fluctuates, e.g., due to beams and beam switching, it may reflect the UE's movement to/away from the SCG PSCell (e.g., the gNB base station). For example, a long-term filtered and/or averaged value may be particularly useful in determining the UE's movement to/away from the cell of the SCG.

These signal quality measurements may be any of various signal quality measurements, e.g., SINR (signal to interference and noise ratio), SNR (signal to noise ratio). RSRP (reference signal received power), RSRQ (reference signal received quality), RSSI (received signal strength indicator), path loss, BLER (block error rate), and/or any desired signal quality measurement. These measurements may be performed with regard to reference signals transmitted by the SCG (e.g., the PSCell). For example, the cell may transmit CRS (cell specific reference signals), SS (synchronization signals), CSI (channel state information) reference signal (CSI-RS), etc. and the UE may perform measurements of those signals to determine one or more signal quality metric(s), such as those discussed above. Thus, the signal quality measurements could include SS-RSRP, CSI-RSRP. NR-RSSI, CSI-RSSI, SS-RSRQ, CSI-RSRQ, SS-SINR, CSI-SINR, etc.

In some aspects, the UE may perform a plurality of measurements over time and may determine a moving average of the signal quality. The moving average may be based on a duration or a number of measurements (e.g., which may be configurable by the network (e.g., the MCG and/or the SCG), specified by 3GPP standards, implemented by the UE, etc.). The moving average may be compared to one or more thresholds to determine whether to use the previous TA parameters (e.g., the last TA parameters used for the SCG prior to deactivation, among other possibilities) or perform a different process.

Thus, in some aspects, the UE may use this filtered or long-term averaged signal strength to determine if the TA parameters can be reused or not. For example, the decision may be based on deviation of the measured PSCell signal strength throughout the deactivated SCG state. In some aspects, the baseline signal strength (from which the deviation is measured) may be the last signal quality measurement value at the time of deactivation, the moving average at the time of deactivation, or another value, as desired.

Figure 12:
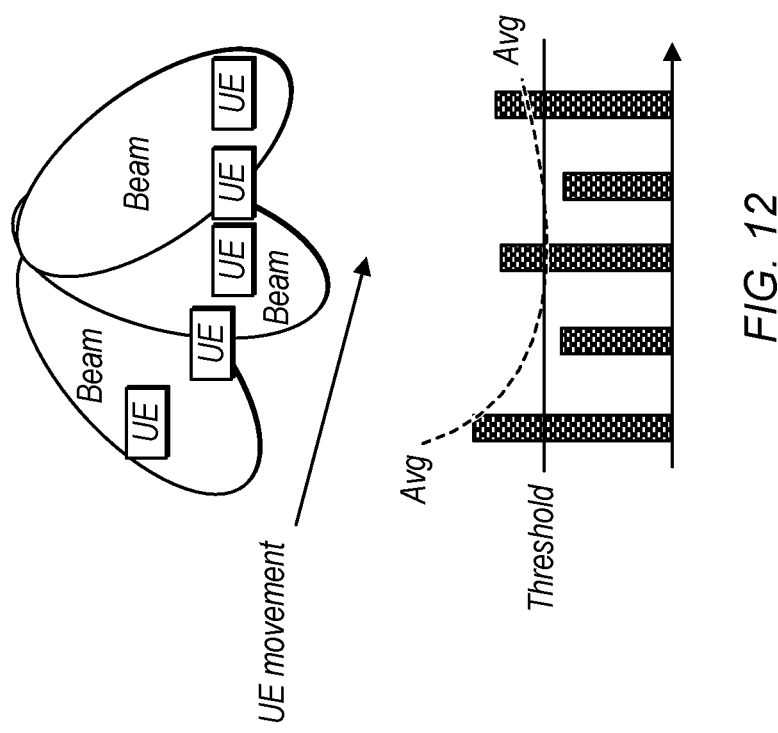
FIGS. 12-14 are diagrams illustrating example UE movements and thresholds, according to some aspects.

FIG. 12 illustrates an exemplary UE movement over time with corresponding signal quality measurements, average signal-quality measurement over time, and a threshold for determining whether to use the previously stored TA parameters. As shown, while the UE moves between beams, the single signal quality measurements may fall below the threshold, while the average remains above the threshold. In the example of FIG. 12, the UE may reuse the TA parameters because the average signal quality remains above the threshold. As shown in the Figure, the final UE distance from the PSCell is similar to the original distance from the PSCell, so reusing the TA parameters should not cause any signal reception errors and allows the UE to skip RACH or another process to redetermine appropriate TA values.

Figure 13:
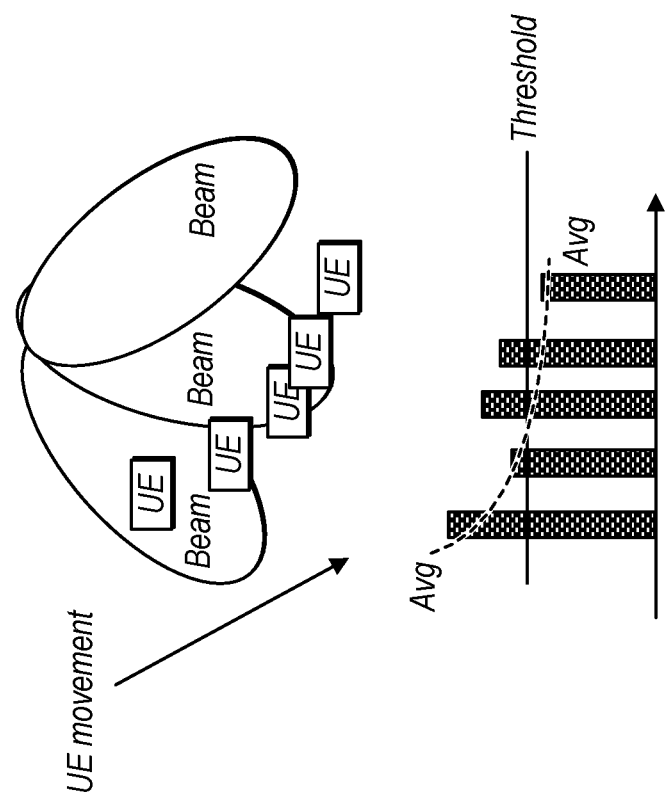

FIG. 13 illustrates a different example, where the UE is moving away from the PSCell and the average declines to below the threshold. In this example, the UE may need to refresh its TA values, e.g., by performing RACH or another process, as desired.

Figure 14:
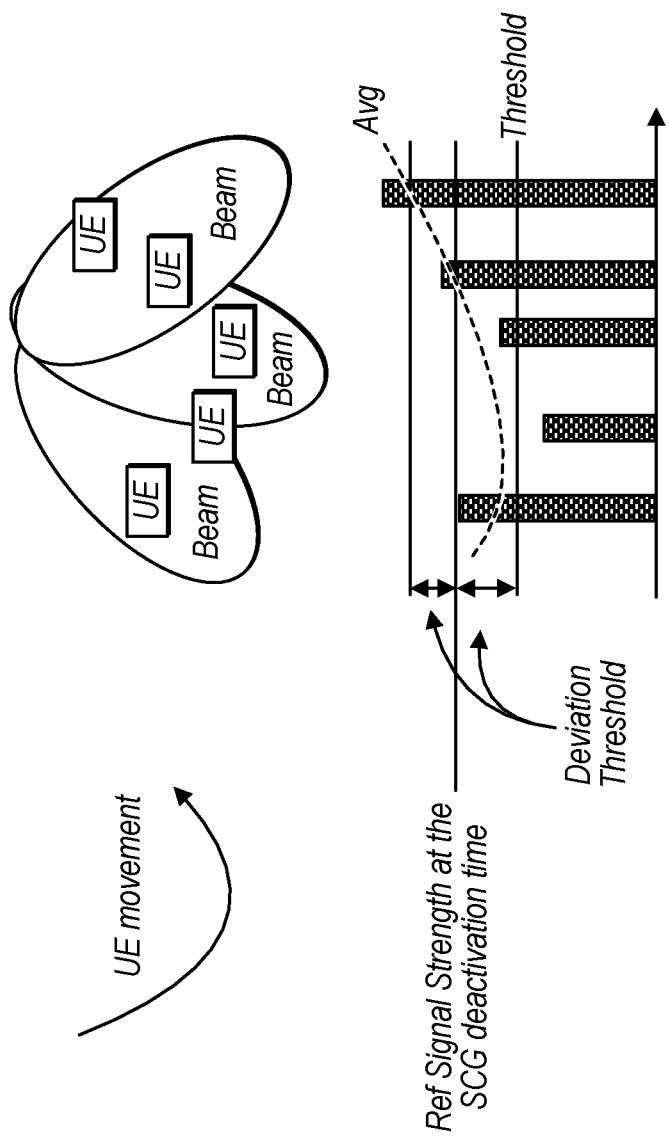

FIG. 14 illustrates an example where the UE may use two thresholds (e.g., an upper and lower threshold). In this instance, the UE moves closer to the PSCell over time, so the TA parameters may need to be redetermined so that the TA values are appropriate for the new, closer distance to the PSCell.

In some aspects, the network may configure various aspects of how and/or when the UE reuses TA parameters. For example, the network (e.g., via communication by the MCG and/or SCG) may configure the UE reuse the TA parameters, e.g., at (e.g., within the SCG deactivation message) or before SCG deactivation.

In some cases, the network may provide an indication to use the stored TA parameters irrespective of whether RRM is configured for the SCG. Thus, in some aspects, the network may intend the UE to always use the TA. Such an indication may be applicable in the cases where the SCG is a small cell and there is no adjustment needed between cell-edge and center of the cell.

As another possibility, the network may configure the UE to use or not use RRM for the SCG, and the UE may modify its behavior based on whether RRM is configured for the SCG. For example, if the network configures the UE to perform the RRM measurements on the PSCell of the deactivated SCG, the UE may perform the determination of whether to reuse the TA parameters as described herein. Alternatively, if the network does not configure RRM for the SCG, the UE may assume that no TA maintenance is necessary. For example, the UE may simply default to reusing the previously stored TA parameters without performing signal quality measurements. In other words, for the case of small cells, where the network determines that the TA deviation is not large between a UE which as the edge of the cell compared to a UE that is near the cell, the network may configure the UE with no actions to perform if the measured time-averaged signal strength has deviated from the configured thresholds. Alternatively, the UE may interpret the lack of configuration of RRM for the SCG as indicating the TA parameters are not valid and perform a different process at activation (e.g., RACH), which results in refreshing the TA parameters.

In some aspects, the network may configure various parameters (e.g., in RRC or other messaging from the MCG, SCG, or another network node) that are used to determine whether to reuse the previously stored TA parameters. Such configuration(s) may be provided at the time of SCG deactivation (e.g., within one or more SCG deactivation messages) or at other times, e.g., prior to SCG deactivation or even during SCG deactivation, as desired. For example, the network may specify the set of reference signals the UE may measure for determining whether to reuse the TA parameters. These reference signals can be the same reference signals the UE uses for RRM purposes, or they can be different, as desired.

As another example, the network may also configure the lower signal quality threshold below which the UE will determine that the TA parameter(s) are not valid. Similarly, the network could configure the upper signal quality threshold above which the UE will determine that the TA parameter(s) are not valid. Note that these thresholds may be configured in an absolute or relative basis. In one aspect, the network may configure a "mean deviation" instead of low/high thresholds, and if the UE's signal strength deviates away from its prior signal quality by more than this value in either direction, the UE may consider the TA value as not valid. This aspect may be particularly relevant to the example shown in FIG. 14.

The network may configure the manner in which the UE averages or filters the signal quality measurements used for determining if the TA parameter(s) are valid. For example, the network may specify the time duration or number of measurements to use for the moving average. The parameters for this averaging may depend on the situation and/or environment of the UE and/or the PSCell. For example, these parameters may depend on the nature of the PSCell (e.g., if it is a small cell), the spectrum used (e.g., greater than 5 GHZ), the terrain surrounding the cell, the current or long-term interference associated with the cell, etc.

The network may also configure how the UE behaves when the UE determines the TA parameter(s) are not valid. For example, the network may configure the UE to perform RACH upon SCG reactivation if the TA parameters should not be used. As another possibility, the network may configure the UE to inform the network (e.g., using the MCG) that the TA is not valid for the SCG. The UE may be configured to inform the network as soon as it determines this (e.g., during SCG deactivation and prior to SCG reactivation) and/or at other times, such as when the network reactivates SCG. In some aspects, the network (e.g., in response to the UE informing the network that the TA parameters are not valid) may trigger uplink SRS (e.g., with the PSCell) in order to update the TA parameters. When the UE performs uplink SRS during the deactivated state, the UE may then receive TA parameters (e.g., a TA adjustment for the previously stored TA parameters) from the PSCell. The UE can then use these updated TA parameters when SCG reactivation occurs.

In some aspects, the network may simply request (e.g., periodically) for the UE to trigger SRS regardless of signal quality measurement results. By performing SRS (e.g., with the PSCell), the UE may be able to perform uplink transmissions and receive TA adjustments even while in the SCG deactivated state.

In some aspects, the signal quality measurements may be outside of the threshold(s) for a period temporarily (including the averaged signal quality measurements), but may return to within the threshold(s) by the time the SCG is reactivated. In such cases, the UE may be configured (e.g., by the network) to reuse the stored TA parameters. For example, this behavior may be useful in configurations where signal strength fluctuations are not very prevalent due to topology and the signal strength reflects the location of the UE from the PSCell in a reasonable way. Alternatively, the UE may be configured to not reuse the TA parameters in such a situation, if desired.

While various aspects discussed above involve the network configuring the UE in determining whether to reuse TA parameters, the network may not be required to perform such configuration. For example, various ones of those configurations could be specified by standards (e.g., 3GPP standards) and/or otherwise known by the UE and/or the network. Additionally, or alternatively, various ones of these configurations may simply be set by the UE (e.g., statically or dynamically) as desired.

In some aspects, the UE may be able to use other information to augment or replace using the signal quality measurements for determining whether to use previously stored TA parameters. For example, the UE may include GPS circuitry that allows it to determine its location. The UE could monitor its GPS location to determine if it is moving and/or is closer or farther away from the PSCell, which may be used to determine whether to reuse the TA parameters. For example, the UE may be aware of the location of the PSCell and may determine a current distance from the PSCell using the UE's current location at the time of reactivation (or before, as desired). In some aspects, the UE may determine to reuse the TA parameter(s) if the distance is within a threshold range. This behavior could be used in addition to or alternatively to the signal quality measurement aspects discussed above.

Additionally, the UE may be able to determine whether it has moved significantly based on MCG communications, which may still be active during the SCG deactivation. For example, the UE may monitor the signal quality or TA parameters of the MCG to determine if the UE has moved significantly relative to the PCell. If the UE determines that it has not moved significantly relative to the MCG, it may infer that it has had low mobility and the TA parameter(s) of the PSCell may still be valid. Similar to above, this behavior could be used in addition to or alternatively to the signal quality measurement aspects discussed above.

Exemplary Aspects

The following descriptions provide exemplary aspects corresponding to various aspects described herein, e.g., such as corresponding to the methods of FIGS. 10-16.

Example 1. A method of operating a wireless device, comprising: by the wireless device: establishing communication with a first base station of a cellular network, wherein the first base station is comprised in a master cell group (MCG): establishing communication a second base station, wherein the second base station is comprised in a secondary cell group (SCG), wherein said establishing communication with the second base station comprises maintaining one or more timing advance (TA) parameters for performing uplink communication with the second base station: receiving an indication to deactivate the SCG: in response to the indication to deactivate the SCG, storing the one or more TA parameters: performing a plurality of signal quality measurements of the second base station: receiving an indication to activate the SCG: comparing one or more of the plurality of signal quality measurements of the second base station to one or more signal quality thresholds: based on said comparing, determining whether to use the stored one or more TA parameters or to obtain a new one or more TA parameters: and communicating with the second base station based on said determining, wherein said communicating with the second base station uses the stored one or more TA parameters or the new one or more TA parameters.

Example 2. The method of example 1, wherein said comparing the one or more of the plurality of signal quality measurements comprises comparing a moving average of two or more of the plurality of signal quality measurements to a lower threshold, wherein said communicating with the second base station is performed using the stored one or more TA parameters based on the moving average of the two or more of the plurality of signal quality measurements being above the lower threshold.

Example 3. The method of Example 2, wherein said comparing comprising comparing the moving average of the two or more of the plurality of signal quality measurements to an upper threshold, wherein said communicating with the second base station is performed using the stored one or more TA parameters based on the moving average of the two or more of the plurality of signal quality measurements being below the upper threshold.

Example 4. The method of Example 1, further comprising: receiving a configuration from the first base station or the second base station, wherein the configuration indicates to attempt to reuse the stored one or more TA parameters.

Example 5. The method of Example 4, wherein the configuration indicates to perform the plurality of signal measurements of the second base station.

Example 6. The method of Example 4, wherein the network configuration indicates the one or more signal quality thresholds.

Example 7. The method of Example 1, further comprising: performing a random access channel (RACH) procedure in response to determining to obtain the new one or more TA parameters, wherein said communicating with the second base station based on the determining is performed after completing the RACH procedure.

Example 8. The method of Example 1, wherein said comparing the one or more of the plurality of signal quality measurements is performed prior to receiving the indication to activate the SCG, wherein the method further comprises: providing an indication that the one or more TA parameters are invalid to the first base station: triggering uplink communication with the second base station during the SCG deactivated state: and determining the new one or more TA parameters based on the uplink communication.

Example 9. The method of Example 1, wherein said comparing the one or more of the plurality of signal quality measurements of the second base station to the one or more signal quality thresholds is performed after receiving the indication to activate the SCG.

Example 10. An apparatus, comprising: at least one processor, configured to cause a wireless device to: establish communication with a first base station of a cellular network, wherein the first base station is comprised in a master cell group (MCG): establish communication a second base station, wherein the second base station is comprised in a secondary cell group (SCG): maintain one or more timing advance (TA) parameters for performing uplink communication with the second base station: receive an indication to deactivate the SCG: perform a plurality of signal quality measurements of the second base station while the SCG is deactivated: receiving an indication to activate the SCG: in response to receiving an indication to activate the SCG, compare a moving average of the plurality of signal quality measurements of the second base station to one or more signal quality thresholds: based on said comparing, determining whether to use previously stored one or more TA parameters or to obtain a new one or more TA parameters: and communicate with the second base station based on said determining, wherein said communicating with the second base station uses the previously stored one or more TA parameters or the new one or more TA parameters.

Example 11. The of apparatus Example 10, wherein said comparing the moving average of the plurality of signal quality measurements comprises comparing the moving average to a lower threshold and an upper threshold, wherein said communicating with the second base station is performed using the stored one or more TA parameters based on the moving average of the two or more of the plurality of signal quality measurements being above the lower threshold and below the upper threshold.

Example 12. The apparatus of Example 10, wherein the at least one processor is further configured to cause the wireless device to: receive a configuration from the first base station or the second base station, wherein the configuration indicates to attempt to reuse the stored one or more TA parameters.

Example 13. The apparatus of Example 12, wherein the network configuration indicates the one or more signal quality thresholds.

Example 14. The apparatus of Example 10, wherein the at least one processor is further configured to cause the wireless device to: perform a random access channel (RACH) procedure in response to determining to obtain the new one or more TA parameters, wherein said communicating with the second base station based on the determining is performed after completing the RACH procedure.

Example 15. The apparatus of Example 10, wherein said determining comprises determining to use the previously stored one or more TA parameters, wherein when using the previously stored one or more TA parameters fails, the at least one processor is further configured to cause the wireless device to: perform a random access channel (RACH) procedure to obtain the new one or more TA parameters: and communicate with the second base station using the new one or more TA parameters.

Example 16. A method, comprising: by one or more nodes of the cellular network: establishing communication with the wireless device, wherein a first node is comprised in a master cell group (MCG) of the wireless device, wherein a second node is comprised in a secondary cell group (SCG) of the wireless device, wherein at least the second node is comprised in the one or more nodes of the cellular network: maintaining one or more timing advance (TA) parameters for receiving uplink communication from the wireless device using the second node: providing a configuration to the wireless device for determining whether to reuse the one or more TA parameters after SCG activation, wherein the configuration indicates to attempt to reuse the one or more TA parameters: at a first time, deactivating the SCG for the wireless device: at a second time, activating the SCG for the wireless device, wherein the wireless device is configured to determine whether to reuse the one or more TA parameters based on the configuration: and communicating with the wireless device using the second node.

Example 17. The method of Example 16, wherein said communicating is performed without performing a random access channel (RACH) procedure with the wireless device in response to the wireless device determining to reuse the one or more TA parameters.

Example 18. The method of Example 16, further comprising: performing a random access channel (RACH) procedure with the wireless device in response to the wireless device determining not to reuse the one or more TA parameters.

Example 19. The method of Example 16, wherein the network configuration indicates at least a first threshold for the wireless device to compare to one or more signal quality measurements of the second base station.

Example 20. The method of Example 16, wherein the first node performs said providing the configuration to the wireless device.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

In some aspects, a device includes: an antenna: a radio coupled to the antenna: and a processing element coupled to the radio. The device may be configured to implement any of the method aspects described above.

In some aspects, a memory medium may store program instructions that, when executed, cause a device to implement any of the method aspects described above.

In some aspects, an apparatus includes: at least one processor (e.g., in communication with a memory), that is configured to implement any of the method aspects described above.

In some aspects, a method includes any action or combination of actions as substantially described herein in the Detailed Description and claims.

In some aspects, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some aspects, a wireless device is configured to perform any action or combination of actions as substantially described herein in the Detailed Description, Figures, and/or claims.

In some aspects, a wireless device includes any component or combination of components as described herein in the Detailed Description and/or Figures as included in a wireless device.

In some aspects, a non-volatile computer-readable medium may store instructions that, when executed, cause the performance of any action or combination of actions as substantially described herein in the Detailed Description and/or Figures.

In some aspects, an integrated circuit is configured to perform any action or combination of actions as substantially described herein in the Detailed Description and/or Figures.

In some aspects, a mobile station is configured to perform any action or combination of actions as substantially described herein in the Detailed Description and/or Figures.

In some aspects, a mobile station includes any component or combination of components as described herein in the Detailed Description and/or Figures as included in a mobile station.

In some aspects, a mobile device is configured to perform any action or combination of actions as substantially described herein in the Detailed Description and/or Figures.

In some aspects, a mobile device includes any component or combination of components as described herein in the Detailed Description and/or Figures as included in a mobile device.

In some aspects, a network node is configured to perform any action or combination of actions as substantially described herein in the Detailed Description and/or Figures.

In some aspects, a network node includes any component or combination of components as described herein in the Detailed Description and/or Figures as included in a mobile device.

In some aspects, a base station is configured to perform any action or combination of actions as substantially described herein in the Detailed Description and/or Figures.

In some aspects, a base station includes any component or combination of components as described herein in the Detailed Description and/or Figures as included in a mobile device.

In some aspects, a 5G NR network node or base station is configured to perform any action or combination of actions as substantially described herein in the Detailed Description and/or Figures.

In some aspects, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    communicating with a first cell of a master cell group (MCG) associated with a first base station of a cellular network;
    receiving, for a second cell of a secondary cell group (SCG) associated with a second base station, a trigger to perform an uplink transmission with the second cell of the SCG;
    in response to the trigger, performing the uplink transmission with the second cell of the SCG prior to a transition of the second cell of the SCG to a first state; and
    receiving a first timing advance parameter based on the uplink transmission to use upon the transition of the second cell of the SCG to the first state to enable skipping of a random access channel (RACH) procedure to the second cell of the SCG.

2. The method of claim 1, further comprising:
    performing uplink communications with the second cell of SCG using the first timing advance parameter while the second cell is in the first state.

3. The method of claim 1, wherein the second cell of the SCG is configured prior to the transition of the second cell of the SCG to the first state.

4. The method of claim 1, further comprising:
    receiving an indication to transition the second cell of the SCG to a second state;
    in response to the indication, storing one or more second timing advance parameters used in uplink communication with the second cell of the SCG;
    receiving an indication to transition one or more cells of the SCG to the first state;
    determining to use a uplink timing based on the one or more second timing advance parameters for the one or more cells of the SCG; and
    performing uplink communications with the one or more cells of the SCG using the uplink timing based on the one or more second timing advance parameters.

5. The method of claim 4, wherein said determining includes determining whether to use the uplink timing based on the one or more second timing advance parameters for the one or more cells of the SCG or performing a different process with the one or more cells in the SCG to establish timing advance parameters.

6. The method of claim 4, wherein said determining includes comparing a moving average of a plurality of signal quality measurements of the one or more cells of the SCG to one or more signal quality thresholds.

7. The method of claim 6, further comprising:
    determining to use the uplink timing based on the one or more second timing advance parameters for the one or more cells of the SCG based on the moving average of two or more of the plurality of signal quality measurements being above a first threshold of the one or more signal quality thresholds.

8. A processor configured to perform operations, the operations comprising:
    communicating with a first cell of a master cell group (MCG) associated with a first base station of a cellular network;
    receiving, for a second cell of a secondary cell group (SCG) associated with a second base station, a trigger to perform an uplink transmission with the second cell of the SCG;
    in response to the trigger, performing the uplink transmission with the second cell of the SCG prior to a transition of the second cell of the SCG to a first state; and
    receiving a first timing advance parameter based on the uplink transmission to use upon the transition of the second cell of the SCG to the first state to enable skipping of a random access channel (RACH) procedure to the second cell of the SCG.

9. The processor of claim 8, the operations further comprising:
    performing uplink communications with the second cell of SCG using the first timing advance parameter while the second cell is in the first state.

10. The processor of claim 8, wherein the second cell of the SCG is configured prior to the transition of the second cell of the SCG to the first state.

11. The processor of claim 8, the operations further comprising:

receiving an indication to transition the second cell of the SCG to a second state;

in response to the indication, storing one or more second timing advance parameters used in uplink communication with the second cell of the SCG;

receiving an indication to transition one or more cells of the SCG to the first state;

determining to use a uplink timing based on the one or more second timing advance parameters for the one or more cells of the SCG; and performing uplink communications with the one or more cells of the SCG using the uplink timing based on the one or more second timing advance parameters.

12. The processor of claim 11, wherein said determining includes determining whether to use the uplink timing based on the one or more second timing advance parameters for the one or more cells of the SCG or performing a different process with the one or more cells in the SCG to establish timing advance parameters.

13. The processor of claim 11, wherein said determining includes comparing a moving average of a plurality of signal quality measurements of the one or more cells of the SCG to one or more signal quality thresholds.

14. The processor of claim 13, the operations further comprising:

determining to use the uplink timing based on the one or more second timing advance parameters for the one or more cells of the SCG based on the moving average of two or more of the plurality of signal quality measurements being above a first threshold of the one or more signal quality thresholds.

15. A method, comprising:

communicating with a user equipment (UE) via a first cell of a master cell group (MCG) associated with a first base station of a cellular network;

transmitting, to the UE, for a second cell of a secondary cell group (SCG) associated with a second base station, a trigger to perform an uplink transmission with the second cell of the SCG;

receiving, from the UE, the uplink transmission via the second cell of the SCG prior to a transition of the second cell of the SCG to a first state; and transmitting, to the UE, a first timing advance parameter based on the uplink transmission to use upon the transition of the second cell of the SCG to the first state to enable skipping of a random access channel (RACH) procedure to the second cell of the SCG.

16. The method of claim 15, further comprising:

performing uplink communications with the UE via the second cell of SCG using the first timing advance parameter while the second cell is in the first state.

17. The method of claim 15, wherein the second cell of the SCG is configured prior to the transition of the second cell of the SCG to the first state.

18. The method of claim 15, further comprising:

transmitting an indication to transition the second cell of the SCG to a second state.

19. The method of claim 18, further comprising:

transmitting an indication to transition one or more cells of the SCG to the first state;

determining to use an uplink timing based on one or more second timing advance parameters for the one or more cells of the SCG, wherein said determining includes performing a different process with the one or more cells in the SCG to establish timing advance parameters; and receiving uplink communications with the one or more cells of the SCG using the uplink timing based on the one or more second timing advance parameters.

20. The method of claim 18, further comprising:

transmitting an indication to transition one or more cells of the SCG to the first state;

determining to use an uplink timing based on one or more second timing advance parameters for the one or more cells of the SCG, wherein said determining includes comparing a moving average of a plurality of signal quality measurements of the one or more cells of the SCG to one or more signal quality thresholds; and receiving uplink communications with the one or more cells of the SCG using the uplink timing based on the one or more second timing advance parameters.

* * * * *